United States Patent [19]

Al-Jalil

[11] 4,201,227
[45] May 6, 1980

[54] CORN SHELLING DEVICE

[75] Inventor: Hamid Al-Jalil, Ames, Iowa

[73] Assignee: Iowa State University Research Foundation, Inc., Ames, Iowa

[21] Appl. No.: 869,375

[22] Filed: Jan. 13, 1978

[51] Int. Cl.² ............................................ A01F 11/06
[52] U.S. Cl. ............................................................. 130/8
[58] Field of Search ............................................... 130/8

[56] References Cited

U.S. PATENT DOCUMENTS

| 241,531 | 5/1881 | Fierrier | 130/8 |
| 254,281 | 2/1882 | Crandall | 130/8 |
| 985,287 | 2/1911 | Sailer | 130/8 |
| 3,508,556 | 4/1970 | Kaminski | 130/8 |

Primary Examiner—Louis G. Mancene
Assistant Examiner—Paul J. Hirsch
Attorney, Agent, or Firm—Zarley, McKee, Thomte, Voorhees & Sease

[57] ABSTRACT

A corn shelling device is disclosed comprising a support structure, a plurality of rollers rotatably mounted within the support structure and having an abrasive outer surface for shearing off the kernels, and power means for rotating each individual roller at a different speed. The rollers are generally cylindrical in shape and disposed at an acute angle with the vertical axis of the support structure so that an ear of corn will be received among the rollers in contact with each roller at one point. An alternate embodiment further skews the rollers at an acute angle to increase the feed of the cob and the shelling speed. A guide directs the corn into position relative to the rollers.

8 Claims, 7 Drawing Figures

CORN SHELLING DEVICE

BACKGROUND OF THE INVENTION

This invention relates to a corn shelling device that allows shearing of the kernels with small impact forces resulting in little damage to the kernels. Conventional corn shellers subject the ears of corn to rough treatment such that the kernels are scratched, cracked or broken, thereby providing openings for the entry of fungus or other organisms which result in spoilage or deterioration. The quality of the corn as a food product is lowered and the yield of seed for planting is reduced which results in financial loss to the farmer.

SUMMARY OF THE INVENTION

A corn shelling device is disclosed comprising a vertical support structure, a plurality of rollers rotatably mounted within the support structure at an acute angle to the vertical, an abrasive outer surface on the rollers for rubbing the kernels off the cob, a guide means to direct the ear of corn into contact with the rollers, and a power means for rotating each individual roller at a different speed from the other rollers. The rollers are symmetrically arranged within the support structure such that an ear of corn will contact the outer surface of each roller at one point. An alternate embodiment of the device further skews the orientation of the rollers relative to the vertical axis of the support structure so as to increase the feed of the cobs and increase the shelling speed.

It is a principal object of this invention to provide an improved corn shelling device.

A further object of the invention is to provide a corn shelling device that reduces the damage to kernels during shelling.

A still further object of the invention is to provide a corn shelling device that produces a rubbing action to shear off the kernels.

A further object of the invention is to provide a corn shelling device that will shear the kernels from the cob at low relative velocity and small impact forces.

A still further object of the invention is to provide a corn shelling device that accommodates different sizes of ears without the necessity of readjusting the machine.

A still further object of the invention is to provide a corn shelling device that is self-feeding.

A still further object of the invention is to provide a corn shelling device that is durable in use, economical to manufacture and refined in appearance.

DESCRIPTION OF THE PREFERRED EMBODIMENT

Figure 1:
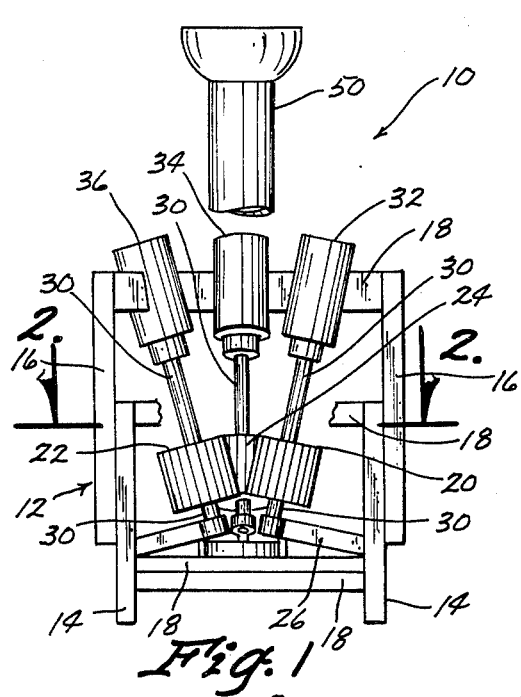
FIG. 1 is a partial front view of the invention.

The numeral 10 generally refers to the corn shelling device shown in FIG. 1.

Corn shelling device 10 is comprised of vertical support frame 12, having legs 14 and vertical support members 16 and horizontal support members 18 as shown in FIG. 1.

Figure 4:
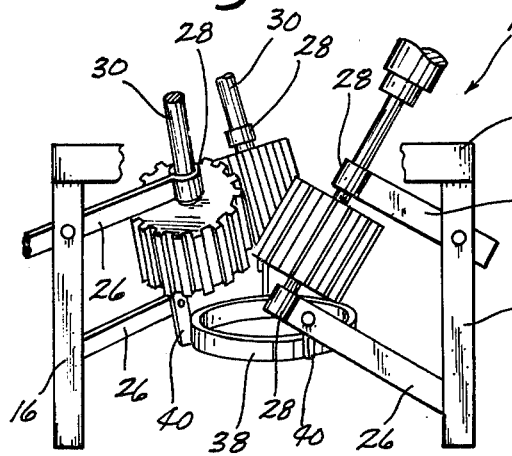
FIG. 4 is a view similar to FIG. 1 showing an alternate embodiment.

Rollers 20, 22 and 24 are rotatably mounted within vertical support frame 12 by means of mounting arms 26 having sleeve 28 at one end and being mounted to vertical support members 16 at the other end. A shaft 30 is connected concentrically to each of the respective rollers 20, 22 and 24, for imparting rotation thereto from motors 32, 34 and 36, respectively. Shaft 30 of each roller is rotatably received by sleeves 28 as shown in FIG. 4 to provide the rotational mounting of the rollers to vertical support frame 12. Hoop 38 is securely attached to the lower set of mounting arms 26 via mounting brackets 40.

Rollers 20, 22 and 24 are cylindrical in shape and have a studded outer surface 42 for removing the kernels from the ear. The rollers are mounted so as to be inclined at an acute angle with the vertical axis 44 (FIG. 3) of the support frame 12. This acute angle is preferably 20° to insure that the ear will contact each roller at one point and the kernels will be sheared from the cob at low relative velocities and small impact forces resulting in very little or no damage at all, depending upon the moisture content and shelling speeds (FIG. 3). For subsequent illustration purposes, the plane containing the vertical axis of roller 20 and the vertical axis 44 of support frame 12 will be designated plane 46 and is indicated in FIG. 2.

Motors 32, 34 and 36, provide the rotational movement via shafts 30 to rollers 20, 24 and 22, respectively.

Figure 2:
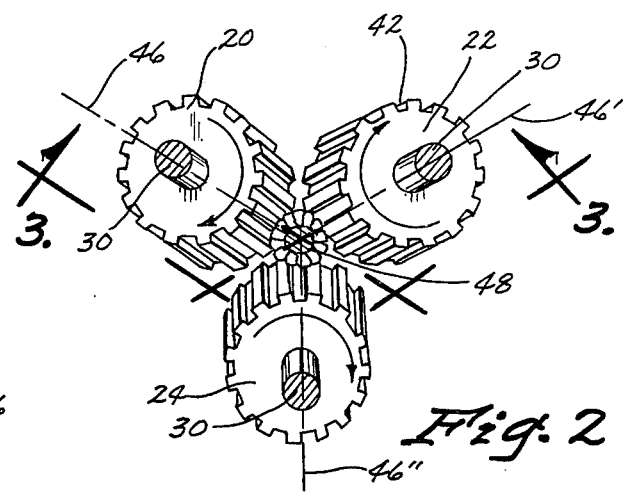
FIG. 2 is an enlarged partial sectional view seen on line 2—2 of FIG. 1.
Figure 3:
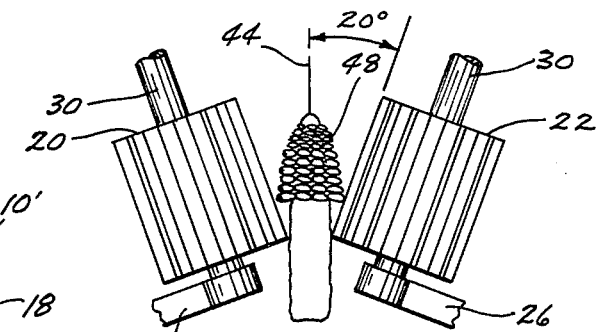
FIG. 3 is a sectional view seen on line 3—3 of FIG. 2.

The motors rotate each respective roller in the same direction as indicated by the arrows in FIG. 2, but at different speeds. Roller 20 is rotated at a low speed, roller 22 is rotated at an intermediate speed, and roller 24 is rotated at a high speed. Rotating the respective rollers at different speeds produces a rubbing action on the ear 48 to remove the kernels.

Since the rollers are inclined at a 20° angle with the vertical axis 44, the ear 48 is insured of making contact with each roller surface 42 at one point as shown in FIG. 3. Cylindrical guide 50 located above vertical support frame 12 directs the ears 48 into the relative poistion shown in FIG. 3. With the rollers inclined and rotated at unequal speeds, the kernels will shear from the cob at low relative velocities and small impact forces which results in very little or no damage at all to the kernels depending on the moisture content and the rotational speeds. The 20° inclination has the additional advantage of allowing the shelling of different sizes of ears without the necessity of readjusting the machine. The clearance between the rollers is fixed to permit the maximum expected cob diameter to pass through the roller arrangement and hoop 38 after the kernels are removed.

Figure 5:
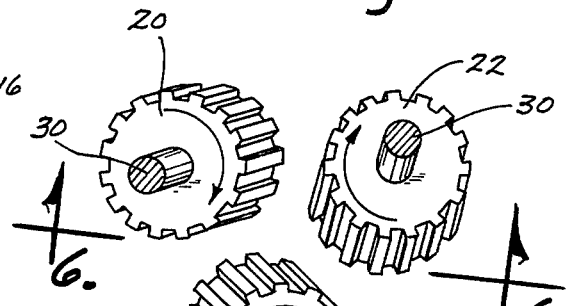
FIG. 5 is an enlarged view similar to FIG. 2 of the alternate embodiment.
Figure 6:
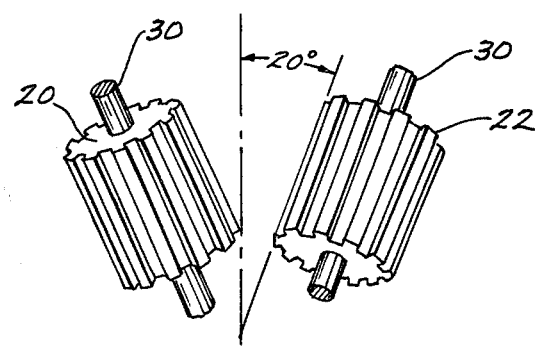
FIG. 6 is a sectional view seen on line 6—6 of FIG. 5.

An alternate embodiment 10' is shown in partial view in FIG. 4. In corn shelling device 10', the rollers are further skewed an additional acute angle relative to the vertical axis 44 (FIG. 5). Referring to the aforementioned plane 46, the roller 20 is inclined an acute angle in a plane (not illustrated) perpendicular to this plane 46. This results in a twisting configuration as illustrated by comparing FIG. 5 and FIG. 2. For further purposes of illustration, the plane formed by the longitudinal axis of roller 22 and vertical axis 44 is designated 46' in FIG. 2, and the plane formed by vertical axis 44 and the longitudinal axis of roller 24 is designated 46". Roller 22 is skewed similarly to roller 20, that is, roller 22 is inclined at an acute angle from plane 46' in a plane (not illustrated) perpendicular to plane 46'. Similarly, roller 24 is skewed at an acute angle from plane 46" in a plane (not shown) perpendicular to plane 46". The result being that the configuration of rollers shown in FIG. 2 is inclined to form the configuration of rollers shown in FIG. 5. The preferred angle of this skewing is also 20°. This further skewing of the rollers imparts on the ear a new component force, i.e., a spinning force and a feeding force.

Figure 7:
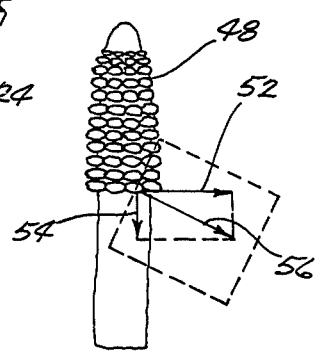
FIG. 7 is a force diagram of the alternate embodiment.

The force diagram shown in FIG. 7 illustrates this effect with arrow 52 being the spinning force vector, arrow 54 being the feeding force vector, and arrow 56 being the resultant force vector. The feeding force accelerates the shelling process by pulling the ear downward in the direction of arrow 54 and results in a lower shelling time and higher shelling capacity.

The rollers of corn shelling device 10' are rotated in the same direction at unequal speeds in the same manner as device 10.

Thus, it can be seen that an improved corn shelling device has been provided which accomplishes at least all of its stated objectives.

What is claimed is:

1. A corn sheller comprising,
    a support means having a vertical axis therethrough,
    a plurality of rollers rotatably mounted within said support means with the longitudinal axis of each of said rollers disposed at a first acute angle with said vertical axis of said support means, each of said rollers having a plurality of projections on the outer surface thereof adapted for rubbing kernels off an ear of corn, and
    power means for rotating each individual roller at unequal speeds.

2. The device of claim 1 wherein said rollers comprise three rollers symetrically oriented around said vertical axis to receive an ear of corn more or less along said vertical axis in contact with said outer surfaces of said rollers.

3. The device of claim 1 wherein said rollers are cylindrical in shape and said outer surfaces are studded.

4. The device of claim 1 wherein said rollers are rotating in the same direction.

5. The device of claim 1 wherein a guide means is operatively connected to said support means to guide an ear of corn into contact with said rollers.

6. The device of claim 1 wherein said first acute angle is 20°.

7. The device of claim 1 wherein said longitudinal axis of each of said rollers being disposed a second acute angle relative to a plane containing said vertical axis with said longitudinal axis also being contained in another plane perpendicular to said plane containing said vertical axis.

8. The device of claim 7 wherein said second acute angle is 20°.